United States Patent
Brandl

(10) Patent No.: US 8,375,226 B1
(45) Date of Patent: Feb. 12, 2013

(54) SYSTEM AND METHOD FOR SELECTIVELY ISOLATING A COMPUTER FROM A COMPUTER NETWORK

(76) Inventor: Raymond Brandl, Fond-du-lac, WI (US)

(*) Notice: Subject to any disclaimer, the term of this patent is extended or adjusted under 35 U.S.C. 154(b) by 1198 days.

(21) Appl. No.: 11/901,574

(22) Filed: Sep. 18, 2007

Related U.S. Application Data

(63) Continuation-in-part of application No. 10/685,554, filed on Oct. 16, 2003, now abandoned.

(60) Provisional application No. 60/427,834, filed on Nov. 20, 2002.

(51) Int. Cl.
- *G06F 11/30* (2006.01)
- *G06F 12/14* (2006.01)
- *G06F 1/26* (2006.01)
- *G06F 11/00* (2006.01)

(52) U.S. Cl. ............. 713/194; 726/34; 726/35; 726/36; 709/220; 709/221; 709/222; 710/200

(58) Field of Classification Search ............. 726/34–36; 713/194; 709/220–222; 710/200
See application file for complete search history.

(56) References Cited

U.S. PATENT DOCUMENTS

| | | | | | |
|---|---|---|---|---|---|
| 3,927,265 | A | * | 12/1975 | Roedel et al. | 379/93.32 |
| 5,202,997 | A | * | 4/1993 | Arato | 726/34 |
| 5,434,562 | A | * | 7/1995 | Reardon | 726/34 |
| 5,802,304 | A | * | 9/1998 | Stone | 709/227 |
| 5,960,172 | A | * | 9/1999 | Hwang | 726/34 |
| 6,032,256 | A | * | 2/2000 | Bernard | 726/34 |
| 6,202,153 | B1 | * | 3/2001 | Diamant et al. | 726/35 |
| 6,212,635 | B1 | * | 4/2001 | Reardon | 713/165 |
| 6,931,552 | B2 | * | 8/2005 | Pritchard et al. | 726/34 |

\* cited by examiner

*Primary Examiner* — Edan Orgad
*Assistant Examiner* — Kari Schmidt
(74) *Attorney, Agent, or Firm* — LaMorte & Associates, P.C.

(57) ABSTRACT

A system and method for providing a firewall system that prevents a computer from being accessed by an unauthorized user via a computer network. The system includes a switch assembly that connects and disconnects the computer from a computer network. The switch assembly is controlled by the types of data transmissions generated by the computer. If the computer generates a data transmission addressed to the computer network, the switch assembly automatically interconnects the computer to the computer network. If the data transmission generated by the computer includes a data request from some point on the computer network, the interconnection with the computer network is held open until the requested data is received. Once the requested data is received, the switch assembly disconnects the computer from the computer network.

8 Claims, 3 Drawing Sheets

SYSTEM AND METHOD FOR SELECTIVELY ISOLATING A COMPUTER FROM A COMPUTER NETWORK

RELATED APPLICATIONS

This application is a continuation-in-part of U.S. patent application Ser. No. 10/685,554, filed Oct. 16, 2003, now abandoned which claims priority of Provisional Patent Application No. 60/427,834 filed Nov. 20, 2002.

BACKGROUND OF THE INVENTION

1. Field of the Invention

The present invention relates to firewall systems and methods that prevent unauthorized users on a computer network from accessing a particular computer that is part of that computer network.

2. Description of the Prior Art

As computers become more commonplace, more and more computer users find themselves using computer networks to access information. Computer networks can be local area networks (LANs) used by a limited number of user, or open networks, such as the World-Wide Web that are used by an unlimited number of users.

When a particular computer is joined to a computer network, that computer can access data contained with other computers that are also joined to that network. However, the flow of data can be recognized in two ways, and it is possible for data to be sent to, or retrieved from, that particular computer without the knowledge of the computer's operator. As such, private data contained on a computer can be accessed by unauthorized users. Furthermore, harmful data, in various forms, can be transmitted to computers.

Computer users that access data from or transfer data to unauthorized computers are commonly referred to as hackers. Protecting personal computers and network computers from hackers is a large business. Hundreds of systems are commercially available that are designed to prevent hackers from accessing network computers. Generally, the name given to a system that protects a computer from hackers is a "firewall" system.

The prior art is replete with firewall systems. Most firewall systems are software based and limit access to computers to authorized users who know the passwords or other encrypted access procedures. However, such systems are vulnerable to hackers who learn or decipher the proper access protocols.

More effective firewalls are created by mixing software with hardware so that a computer can be physically isolated from a network. If a computer is physically isolated from a network, it is not possible for a hacker of the computer network to retrieve data from or send data to the isolated computer. However, when a computer is isolated from a computer network, that computer also cannot send or receive desired data from the computer network. Such isolation firewalls are therefore impractical for most applications of computers that exchange data on a network.

In an attempt to make isolation firewalls more practical, firewall systems have been developed that temporarily isolate a computer from a computer network. Such prior art isolation firewall systems are exemplified by U.S. Patent Application Publication 2001/0054159 to Hoshino, entitled Switch Connection Control Apparatus For Channels. In the Hoshino publication, a firewall system is disclosed where incoming data is temporarily held in an isolated buffer, where it is scanned. Once the data is scanned and is determined as being authorized, the buffer is coupled to the processor of the computer via a physical switch. The same isolated buffer is also used to hold and scan outgoing data. As such, outgoing data is stored in the buffer and is sent to an outgoing modem only after the outgoing data has been scanned and has been determined to be authorized.

A single switch is used to connect the buffer between the computer and the outgoing lines. When the switch is in a first position, data can flow into the buffer from the computer. When the state of the switch is changed, data can flow into the buffer from the computer network.

The obvious drawbacks of a system, such as that shown in Hoshino publication, are that incoming and outgoing data cannot be processed simultaneously. Rather, all outgoing and incoming data is batched. The buffer can hold either incoming data or outgoing data, but not both. Furthermore, both incoming data and outgoing data are limited by buffer size. If a file is being downloaded that is larger than the buffer allotment, such a file cannot be successfully loaded using a Hoshino-like system. The use of a buffer also doubles download time. A computer user must now wait for data files to download to the buffer and be scanned. The user must then wait again for the buffer to download the data files to the computer.

A need therefore exists for a firewall system that selectively isolates a computer from a computer network, yet allows for an unlimited amount of data to be exchanged with the network when authorized. A need also exists for such a firewall system that can simultaneously send and receive data without having batch transmissions in a buffer. Such needs are provided for by the present invention as described and claimed below.

SUMMARY OF THE INVENTION

The present invention is a system and method for providing a firewall system that prevents a computer from being accessed by an unauthorized user via a computer network, such as the Internet. The system includes a switch assembly that connects to a computer. The switch assembly is configurable between a closed condition and an open condition. The switch assembly connects and disconnects the computer from a computer network. The switch assembly is controlled by the types of data transmissions generated by the computer. If the computer generates a data transmission addressed to the Internet or other computer network, the switch assembly automatically interconnects the computer to the computer network. If the data transmission generated by the computer includes a data request from some point on the computer network, the interconnection with the computer network is held open until the requested data is received. Once the requested data is received, the switch assembly disconnects the computer from the computer network and again isolates the computer. Thus, the computer only connects to the computer network when necessary, thereby leaving little opportunity for the computer to be accessed by an unauthorized user.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention firewall system and method can be used to protect any computer that is part of any computer network, the present invention is particularly well suited for protecting a personal computer from hackers on the Worldwide Web. Accordingly, by way of example, the present invention will be described as being applied to a computer that is attached to the Worldwide Web. Such an embodiment is set forth to present the best contemplated mode for the present invention and should not be considered a limitation to the scope of the invention as claimed.

Figure 1:
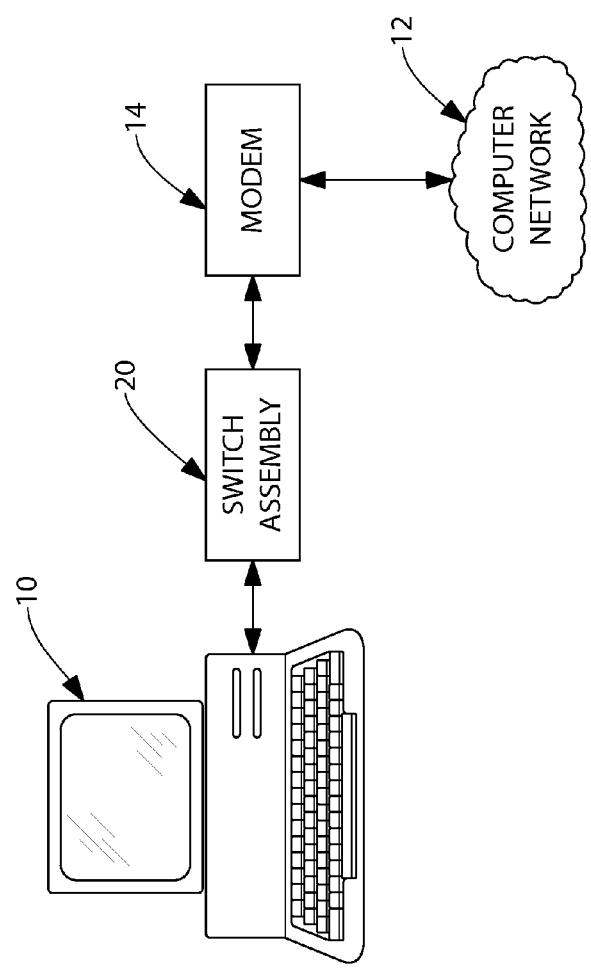
FIG. 1 is a schematic of a computer network system containing a switch assembly in accordance with the present invention.

Referring to FIG. 1, a computer system schematic is shown, where a personal computer 10 is coupled to a computer network 12, via a modem 14. The present invention firewall system is shown as a switch assembly 20, physically positioned between the personal computer 10 and the modem 14. As such, all data flowing between the modem 14 and the personal computer 10 passes through the switch assembly 20.

The purpose of the switch assembly 20 is to physically connect and disconnect the modem 14 and the personal computer 10. As will be explained, the switch assembly 20 normally keeps the personal computer 10 disconnected from the modem 14. As such, the personal computer 10 is normally physically isolated from the computer network 12. However, the switch assembly 20 automatically interconnects the personal computer 10 to the modem 14 whenever the computer 10 generates a data transmission addressed to a point on the computer network 12. Similarly, when the data transmission contains a data retrieval protocol, the switch assembly 20 maintains the open interconnection between the personal computer 10 and the modem 14 until a return data transmission ends. Once the return data transmission ends, the switch assembly 20 automatically disconnects the personal computer 10 from the modem 14.

Accordingly, the switch assembly 20 isolates the personal computer 10 from the computer network 12 until a data exchange is specifically requested with the computer network 12. In that circumstance, the personal computer 10 is connected to the computer network 12 only for a period of time sufficient to complete the requested data exchange. Once the data exchange is complete, the personal computer 10 is again automatically isolated from the computer network 12.

When a computer exchanges data with a computer network 12, certain data transmissions have execution and termination protocols that indicate the beginning and ending of the data transmission. The protocols vary depending upon the program language and operating systems being used. Most modern operating systems detect these protocols during a data exchange.

Most all protocols used by computer networks are specified in Request For Comment (RFC) documents. RFC documents are publicly known. One of the most commonly used protocols is Hyperflex Transfer Protocols (HTTP). Every web server on the Internet conforms to HTTP protocols. One of the most common commands in HTTP is the "GET filename" command protocol. An expert in the field would understand that if a person were on a personal computer and were trying to access the Patent Office website (www.uspto.gov) via the internet, the personal computer would transmit the following line of code in HTTP —GET http://www.uspto.gov—

Once that line of HTTP protocol is transmitted, the server of the Patent Office website responds by transmitting the contents of the website requested.

Once a "GET filename" command is received by a server, the server downloads the contents of the requested website. The website is written in Hyper Tect Markup Language (HTML). As will be understood by systems programmers, website files begin with the HTML tag <HTML>. That is, in the programming language of the website, the first line of the program code is <HMTL>.

Similarly, all website files end with the HTML tag </HMTL>. It will therefore be understood that when information is downloaded from a website, the first line of code received is <HMTL> and the last line of code received is </HMTL>. A computer can therefore detect the beginning and the end of a data transmission by detecting the proper HMTL code.

As will be explained, the personal computer 10 utilizes the protocols of data not only to detect the beginning and end of a data file but to connect and disconnect the computer 10 to and from the network 12.

The present invention system utilizes the execution protocols and termination protocols of a data transmission to trigger the physical connection and interconnection between a personal computer 10 and a computer network 12. Each time an outgoing data transmission is generated by the personal computer 10, the personal computer 10 is joined to the computer network 12. Each time a data transmission is received from the computer network 12 with a termination protocol, the personal computer 10 is disconnected from the computer network 12.

In the embodiment of FIG. 1, the modem 14 and the switching assembly 20 are shown outside the structure of the personal computer 10. Such an embodiment is merely exemplary. Many personal computers exist that have internal modems. It will be understood that the switching assembly 20 can also be configured as a peripheral board that can be internally added to a computer.

Figure 2:
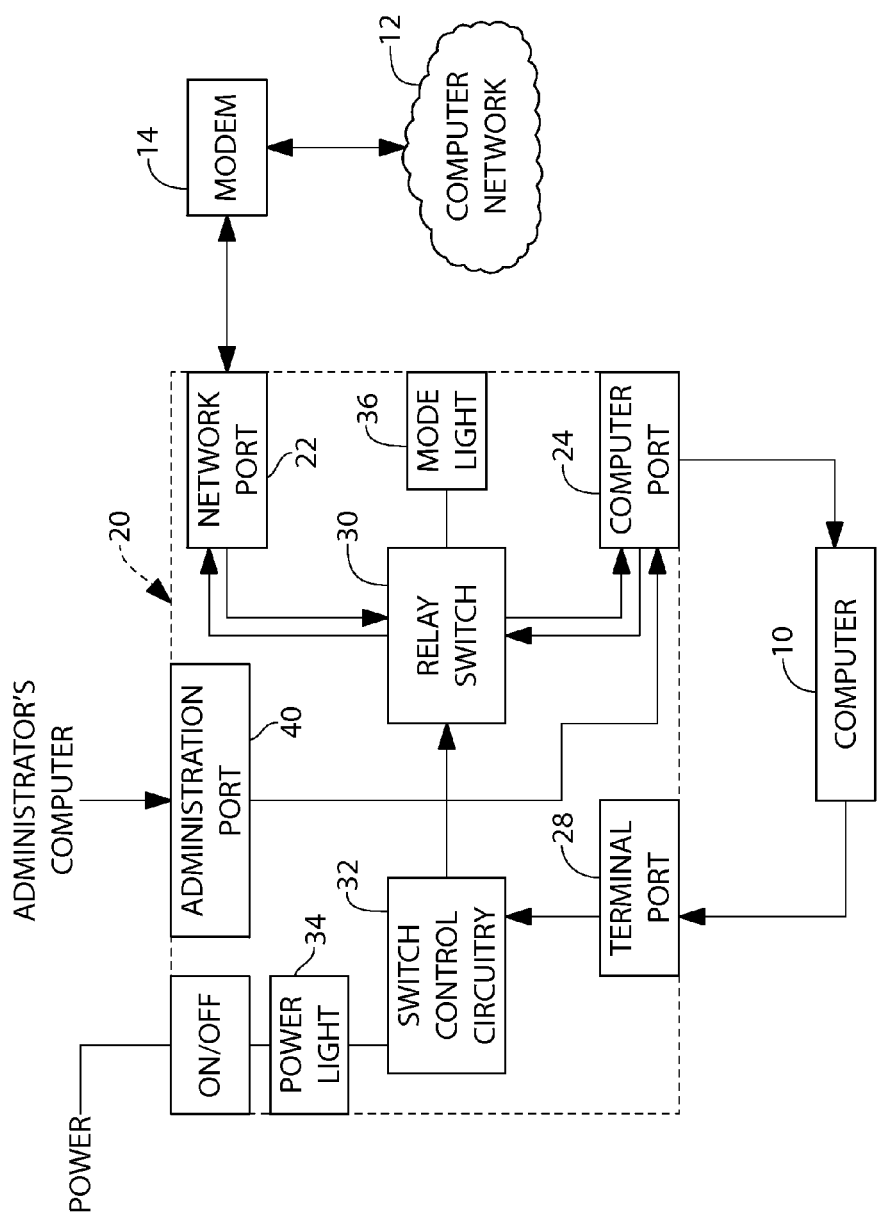
FIG. 2 is a schematic of the switch assembly shown in FIG. 1.

Referring now to FIG. 2, a schematic of the switching assembly 20 is shown. From FIG. 2, it can be seen that the switching assembly 20 has a network port 22 for receiving a connection cable from a modem 14, and a computer port 24 for receiving a connection cable from the personal computer 10. Both the network port 22 and the computer port 24 are coupled to a common relay switch 30. The relay switch 30 moves between an open condition and a closed condition. When the relay switch 30 is in the closed condition, the network port 22 is connected to the computer port 24 and a completed transmission line is established through the switch assembly 30. However, when the relay switch 30 is in its open condition, the network port 22 is not interconnected with the computer port 24 and no transmission line is established.

A switch control circuit 32 controls the operation of the relay switch 30. The operation of the switch control circuit 32 is done by software being run in the computer 10. A terminal port 28 is provided in the switch assembly 20 that receives a control cable from the computer 10. The switch control circuit 32 is joined to this terminal port 28 and is therefore capable of receiving instructions from the computer 10.

As has previously been explained, when the computer 10 generates an outgoing data stream that is addressed to a point on a computer network 12, the operational software of the computer 10 can detect this condition. Software is loaded into the computer 10 that is used to generate a signal to the switch control circuit 32 when this condition occurs. When the switch control circuit 32 receives such an operational signal, the switch control circuit 32 causes the relay switch 30 to move into its closed condition and thus interconnect the computer 10 to the modem 14. If the data sent to the computer network 12 requests return data, the relay switch 30 remains in its closed condition until a return data stream is received. Once the termination protocol at the end of the return data stream is detected, the switch control circuit 32 is directed to alter the relay switch 30 to its open condition. This separates the modem 14 from the computer 10 and isolates the computer 10 from the computer network 12.

The operational software loaded into the computer detects the HMTL tags at the beginning and end of data transmission. An exemplary subroutine that illustrates operations between the operational software and the switch control circuit 32 when a user sends data from the computer 10 to the network 12 is as follows:

IF [data file are ready to be sent to computer network]
AND [user is online] OR [user's Internet protocol is selected]
THEN
DO [loop until requirements met]
open relay switch
send data files
detect HMTL tag for beginning of each data file
detect HMTL tag for end of each data file
IF [HMTL ending data tag received for last data file] THEN
close relay switch
END IF An exemplary subroutine for a data communication from the network 12 to the computer 10 would be as follows:

IF [data file sent to computer via network is requested]
AND [system is enabled]
THEN
DO [loop until requirements met]
open relay switch
receive data files
detect HMTL tag for beginning of each data file
detect HMTL tag for end of each data file
IF [HMTL ending data tag received for last data file] THEN
close relay switch
END IF It will be understood that the operational subroutines presented above can be written in many programming languages.

From the above exemplary subroutines, it will be understood that switch control circuit 32 selectively closes the relay switch 30 when data is requested from the computer network 12 and keeps the relay switch 30 closed until the requested data is received. At that point, the relay switch 30 is opened.

Included in the software provided to the personal computer 10 that controls the switch assembly 20, is a command protocol that enables the normal operational parameters of the relay switch 30 to be overridden. As such, a person using the personal computer 10 can specifically instruct the switch control circuit 32 to close or open the switch relay 30 and keep it in that condition. In this manner, a person can create an open connection to the computer network 12 or totally isolate the computer 10 from the computer network 12, depending upon desired circumstances.

Two sets of operational lights are provided on the switch assembly 20. The first operational light is a power light 34 and provides a visual indication as to whether or not the switch assembly 20 is powered. The relay switch 30 in the switch assembly 20 is preferably a "normally open" switch. As such, should the switch assembly 20 not be powered, the relay switch 30 would be opened and the computer would be isolated from the computer network 12.

The second operational light is a mode light 36 that is coupled to the relay switch 30 and provides a visual indication as to whether the relay switch 30 is in an open condition or a closed condition. In this manner, a person viewing the switch assembly 20 can tell if the computer 10 is isolated or connected to the computer network 12.

In many computer network applications, systems administrator is in charge of a group of computers. For the purpose of software updates and inter-office software applications, it is commonly desirable to provide the systems administrator with access to all of the computers in his charge.

For this purpose, an administration port 40 is provided in the switch assembly 20. The administration port 40 can be attached to the systems administrator's computer and therein interconnect the user's computer to the systems administrator's computer.

Figure 3:
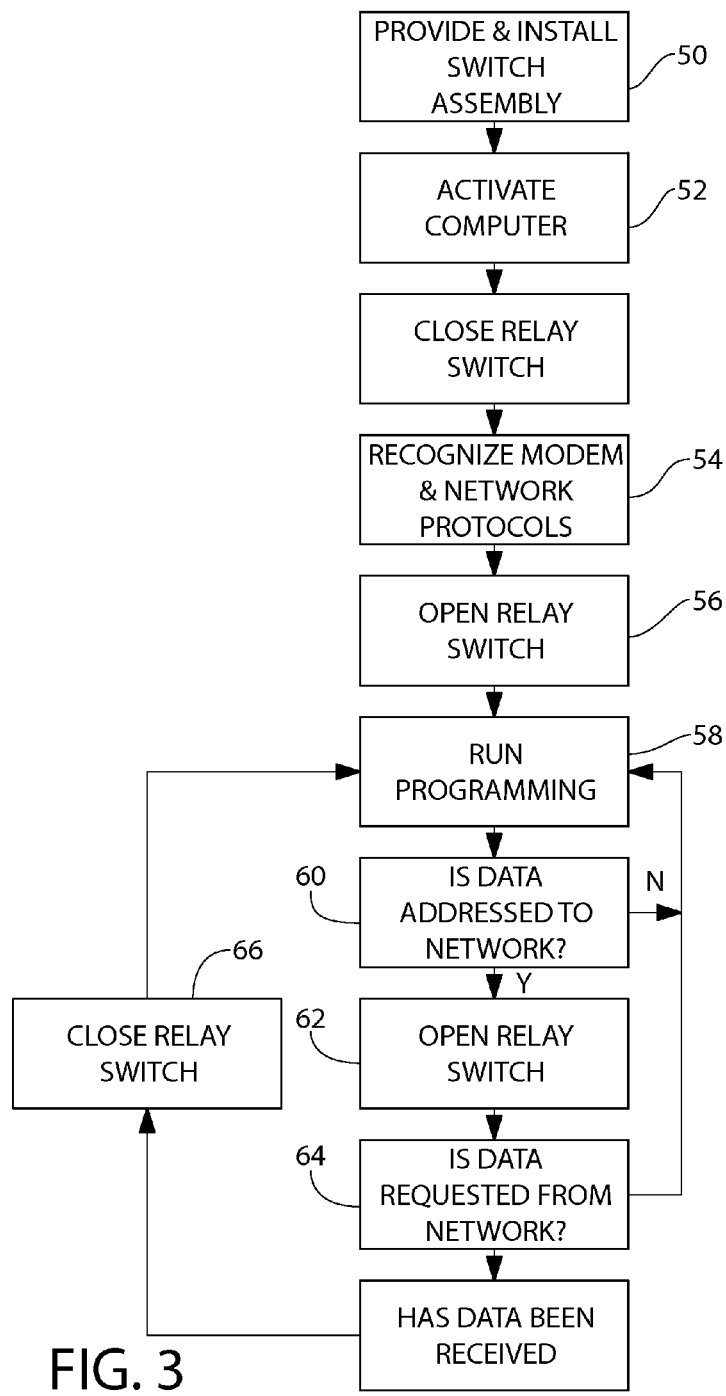
FIG. 3 is a logic flow block diagram showing a method of operation for the present invention.

Referring to FIG. 3, an exemplary method of operation for the present invention system is shown. As is indicated by Block 50, a user first provides and installs the switch system to their computer. The configuration of the user's computer therefore complies with the schematic previously described with reference to FIG. 2.

As is indicated by Block 52, a user activates their computer. This causes the computer to boot up and run its operating system software. During the initial boot up of the computer, the switch relay 30 (FIG. 2) is moved to its closed condition so that the computer is interconnected with the modem and the computer network as it boots up. This enables the computer to identify the address of the modem as well as recognize any protocols required to access the computer network. See Block 54. After the boot up is complete, the relay switch automatically reverts to its open condition and isolates the computer from the computer network. See Block 56.

The computer is used in a the normal manner by a user. The relay switch remains in its open condition for as long as a user does not run software that tries to access data via a computer network. See Block 58.

If a program application is run that sends data to and/or requests data from the computer network, the entered commands are monitored. If data is to be sent to the computer network, as indicated by Block 60, then the relay switch is moved to its closed condition and the computer is linked to the computer network. See Block 62. Furthermore, if data sent to the computer network contains a request for a data from the computer network, as indicated by Block 64, then the relay switch is kept in its closed condition and the interconnection with the computer network is kept open. The relay is kept open until the data requested from the computer network has been received, regardless of the period of time that may take. Once the requested data is received, the relay switch again automatically shifts to its open condition and the computer is isolated from the computer network. See Block 66.

From the above, it will be understood that using the present invention system and method, a computer can be selectively isolated from a computer network. The computer only interconnects with the computer network during periods of requested data exchange with the computer network. Any attempts generated from the computer network to either send or retrieve data to the protected computer will be unsuccessful because such attempts cannot open the relay switch to connect the protected computer to the computer network.

It will be understood that the schematics and methods of operation shown and described are merely exemplary and that the present invention can be altered in many ways. For example, there are many circuits and electronic components that can act as switches. Any such design can be used for the relay switch of the present invention. Furthermore, the present invention need not be attached to a computer but can be designed directly into the hardware of a computer. All such modifications and alternate embodiments are intended to be included within the scope of the present invention as claimed below.

What is claimed is:

1. In a system where a computer network is accessible by a computer via a modem, a method of selectively connecting and disconnecting the computer with the computer network, consisting of the steps of:
   providing a computer and a modem that communicate through a connection;
   providing a switch between the computer and said modem, said switch being configurable between an open condition, where said switch disrupts said connection, and a closed condition where said switch does not disrupt said connection;
   maintaining said switch in said open condition as a default, thereby isolating the computer from said modem and the computer network;
   automatically causing said switch to change to said closed condition when the computer generates an initial data transmission addressed to a location on the computer network; and
   automatically returning the switch to the default open condition upon the conclusion of said data transmission that was sent to the computer network.

2. The method according to claim 1, wherein said initial data transmission contains a request for return data from the computer network.

3. The method according to claim 2, further including the step of maintaining said switch in said closed condition until said requested return data is received from the computer network, before said step of returning the switch to the default open condition.

4. The method according to claim 1, wherein the computer has a boot-up period when the computer is first activated.

5. The method according to claim 4, further including the step of maintaining said switch in said closed condition throughout said boot up period.

6. The method according to claim 1, further including the step of providing a visual indication as to whether said switch is in said open condition or said closed condition.

7. A hacker resistant computer networking system, comprising:
   a computer network;
   at least one computer that can be selectively joined to said computer network, wherein each computer is joined to the computer network via a modem; and
   a switch assembly associated with each computer for selectively connecting and disconnecting the computer to its modem, wherein said switch assembly automatically connects the computer to said modem and the computer network when a data request is addressed to the computer network and automatically disconnects the computer from said modem and the computer network once request data in response to said data request is received by the computer from the computer network.

8. The system according to claim 7, wherein said switch assembly includes:
   a first port for receiving a connection that connects said switch assembly to said modem;
   a second port for receiving a connection that connects said switch assembly to the computer;
   a switch, coupled to said first port and said second port for selectively opening and closing a connecting pathway between said first port and said second port; and
   a terminal port for receiving instructions from said computer to open and close said switch.

* * * * *